United States Patent [19]
Fosseen

[11] Patent Number: 4,958,598
[45] Date of Patent: Sep. 25, 1990

[54] ENGINE EMISSIONS CONTROL APPARATUS AND METHOD

[75] Inventor: Dwayne Fosseen, Radcliffe, Iowa

[73] Assignee: Midwest Power Concepts, Ltd., Radcliffe, Iowa

[21] Appl. No.: 419,254

[22] Filed: Oct. 10, 1989

[51] Int. Cl.$^5$ .............................................. F02B 75/12
[52] U.S. Cl. .................. 123/1 A; 123/25 L; 123/25 J; 44/55
[58] Field of Search ............. 123/1 A, 25 L, 25 J, 123/180 AC; 44/55

[56] References Cited

U.S. PATENT DOCUMENTS

| | | | |
|---|---|---|---|
| 4,306,942 | 12/1981 | Brush et al. | 203/19 |
| 4,333,739 | 6/1982 | Neves | 44/52 |
| 4,385,593 | 5/1983 | Brooks | 123/25 L |
| 4,553,504 | 11/1985 | Duggal et al. | 123/1 A |
| 4,708,118 | 11/1987 | Rawlings | 123/25 L |

*Primary Examiner*—E. Rollins Cross
*Attorney, Agent, or Firm*—Kent A. Herink

[57] ABSTRACT

Apparatus and method for reducing the emissions of a diesel engine. A hydrous alcohol fuel of low proof supplements the diesel fuel, particularly in high acceleration and high r.p.m. conditions. The fuel is fumigated into the airstream of the intake manifold of the engine by a fuel injector that is supplied both the alcohol fuel and air under pressure. Control apparatus begins delivery of the alcohol fuel above a selected engine r.p.m. and the amount delivered generally corresponds to engine r.p.m. Under heavy acceleration, the flow of diesel fuel is reduced and engine power is brought back up by the alcohol fuel. No alcohol fuel is used when the engine is decelerating or reducing its r.p.m.'s.

16 Claims, 5 Drawing Sheets

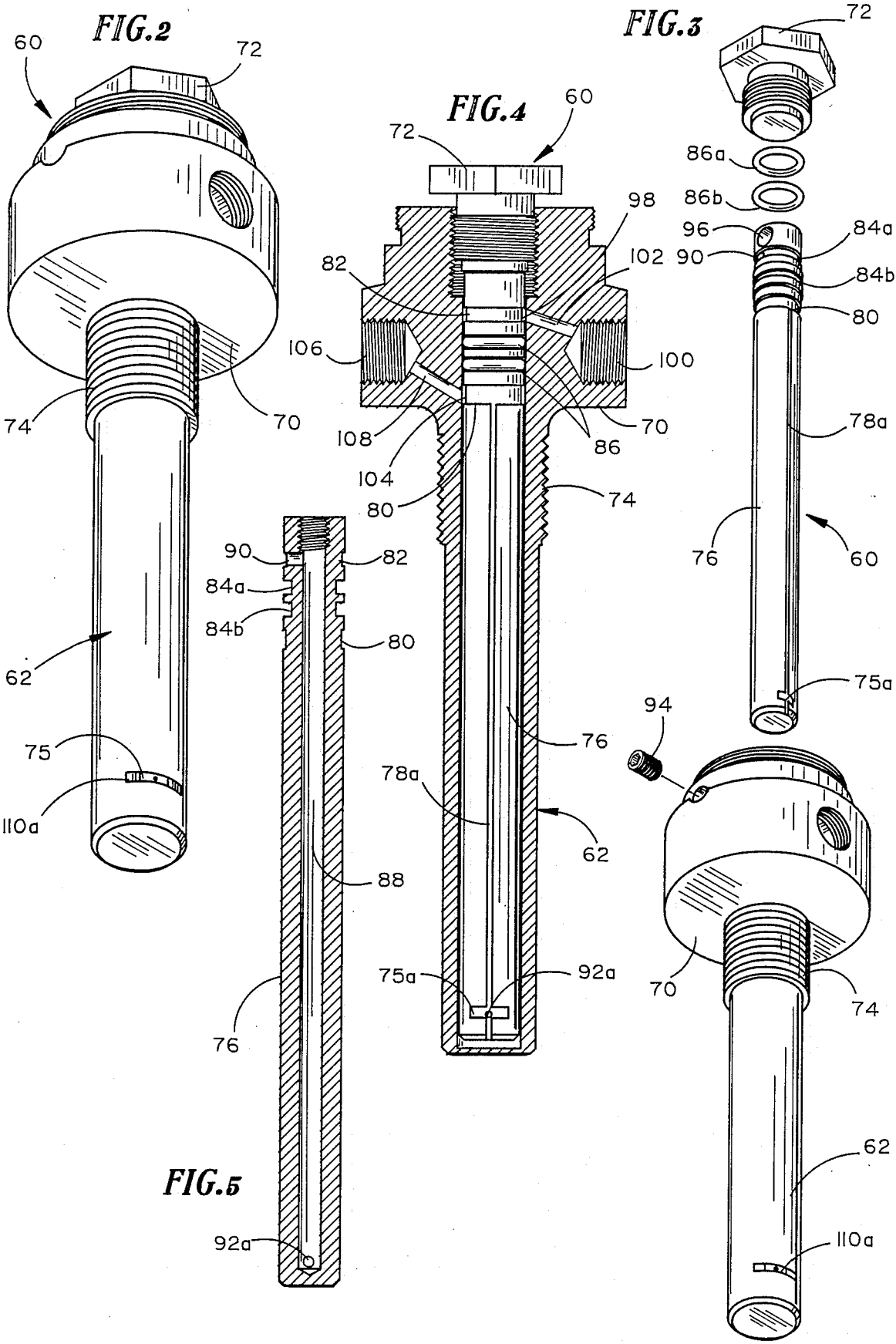

ENGINE EMISSIONS CONTROL APPARATUS AND METHOD

BACKGROUND OF THE INVENTION

The invention relates generally to apparatus and a method of reducing the emissions of a diesel engine and, more specifically, to the use of low-proof hydrous alcohol fuels in a modified diesel engine for reducing the polluting emissions of the engine.

Internal combustion emissions are the primary cause of air pollution in many cities and metropolitan areas. Such emissions include uncombusted hydrocarbons, hydrocarbons formed in the combustion process, sulfur oxides, nitrogen oxides, and particulate matter. To attempt to reduce the quantities of these emissions, the federal and state governments have imposed emission standards. These standards typically apply to new engines, but have also been applied on a fleet-average basis to include previously manufactured engines in the emission reduction strategy. Over time, the standards have required lower and lower levels of emissions. New standards have been proposed to take effect in the next several years that will further significantly reduce the level of emissions that will be permitted of diesel engines widely used in the trucking and mass transit industries. There have, accordingly, been many and diverse attempts to reduce the levels of emissions, both of newly manufactured engines and of previously manufactured engines, through modification and add-on equipment programs.

Hydrocarbon emissions are undesirable because of the role they play in air pollution and also because they represent an energy loss from that available in the hydrocarbon fuel used in the engine. Sulfur oxides not only participate in local air pollution, including photochemical smog, but also are the principal cause of acid rain. Urban smog is caused primarily by nitrogen oxides (NOX). The black smoke of diesel engine exhaust is typically caused by particulate emissions which add to local air pollution and may cause health problems, including cancer, known to be caused by the polycyclic aromatic compounds in the solvent organic fraction of the particulates.

The levels of emissions of an engine are interrelated by complex and poorly understood mechanisms. It is known, for example, that adding anhydrous alcohol to gasoline will actually increase the hydrocarbon content of the fuel, but will also tend to reduce the levels of emitted particulates and carbon monoxide. Increasing the temperature of the in-cylinder combustion will usually result in more complete combustion of the fuel, and so reducing hydrocarbon emissions, but will result in an increase in nitrogen oxides and affect the polycyclic aromatic hydrocarbon constituents of the particulates. Sulfur oxide emissions can be reduced by using low-sulfur fuels, but it is known that reducing sulfur in the fuel normally changes the aromatics and boiling range of the fuel, both of which affect the amount of particulates emitted.

Many attempts have been made to improve engine efficiencies and reduce emissions, including the use of a hydrous alcohol supplemental fuel. In U.S. Pat. No. 4,708,118, a radically modified internal combustion engine, having three valves per cylinder, employed an injector to deliver a combination liquid and vapor fuel. A hydrous methanol mixture was added to the fuel in the intake manifold to lower the temperature of combustion and thereby reduce nitrogen oxide emissions. No teaching is provided in the patent as to the ratio of water to alcohol, or proof of the water/methanol mixture or of the timing amount of the hydrous methanol fuel used in the engine. Neither is there any direct control over the availability of the hydrous methanol to the engine.

U.S. Pat. No. 4,385,593 teaches a mixture of water and an unspecified alcohol that is heated to a gaseous state and mixed in the intake manifold with the gasoline and air mixture from the carburetor. The hydrous alcohol fuel is described to increase the mileage by as much as 10-20 percent. The patent teaches such fuel mixtures only for use with carbureted gasoline engines.

SUMMARY OF THE INVENTION

The invention consists of apparatus for modifying a diesel engine to use a low-proof hydrous alcohol supplemental fuel which will reduce the level of polluting emissions of the diesel engine. An injector is used for fumigating of the hydrous alcohol fuel into an intake manifold of either a turbocharged or naturally aspirated engine where it will be entrained in the airstream and carried into a combustion chamber. Alternatively, the hydrous alcohol is injected directly into the combustion chamber. Means for controlling the quantity and timing of delivery of the hydrous alcohol fuel is provided.

More specifically, respecting a preferred embodiment of the invention, a turbocharged diesel engine is modified by the introduction of an injector nozzle into the intake manifold down-stream of the turbocharger. A mixture of water and either methanol or ethanol, in the ratio to provide approximately an eighty proof mixture, and a small amount of water-soluble oil, is held in a reservoir or fuel tank. During acceleration phases of the operation of the diesel engine, and in response to actuation of the accelerator pedal by an operator, an air-actuated cylinder will direct pressurized hydrous alcohol to the injector nozzle. The pressurized hydrous alcohol is injected into the intake manifold of the engine and is atomized by pressurized air at the distal end of the nozzle for fumigation of the hydrous alcohol fuel. The airstream in the intake manifold will carry the entrained hydrous alcohol into the cylinder of the diesel engine. The effect of the hydrous alcohol fuel is to reduce the nitrogen oxide, particulate, and carbon monoxide emissions of the engine. Exhaust treatment apparatus are employed to remove hydrocarbon emissions and further reduce other emissions.

BRIEF DESCRIPTION OF THE DRAWINGS

FIG. 2 is a perspective view of a fuel injector for delivering the hydrous alcohol fuel to the diesel engine;

FIG. 3 is an exploded perspective view of the fuel injector;

FIG. 4 is a cross-sectional view of the fuel injector;

FIG. 5 is a cross-sectional view of a nozzle of the fuel injector;

DETAILED DESCRIPTION OF A PREFERRED EMBODIMENT

Figure 1:
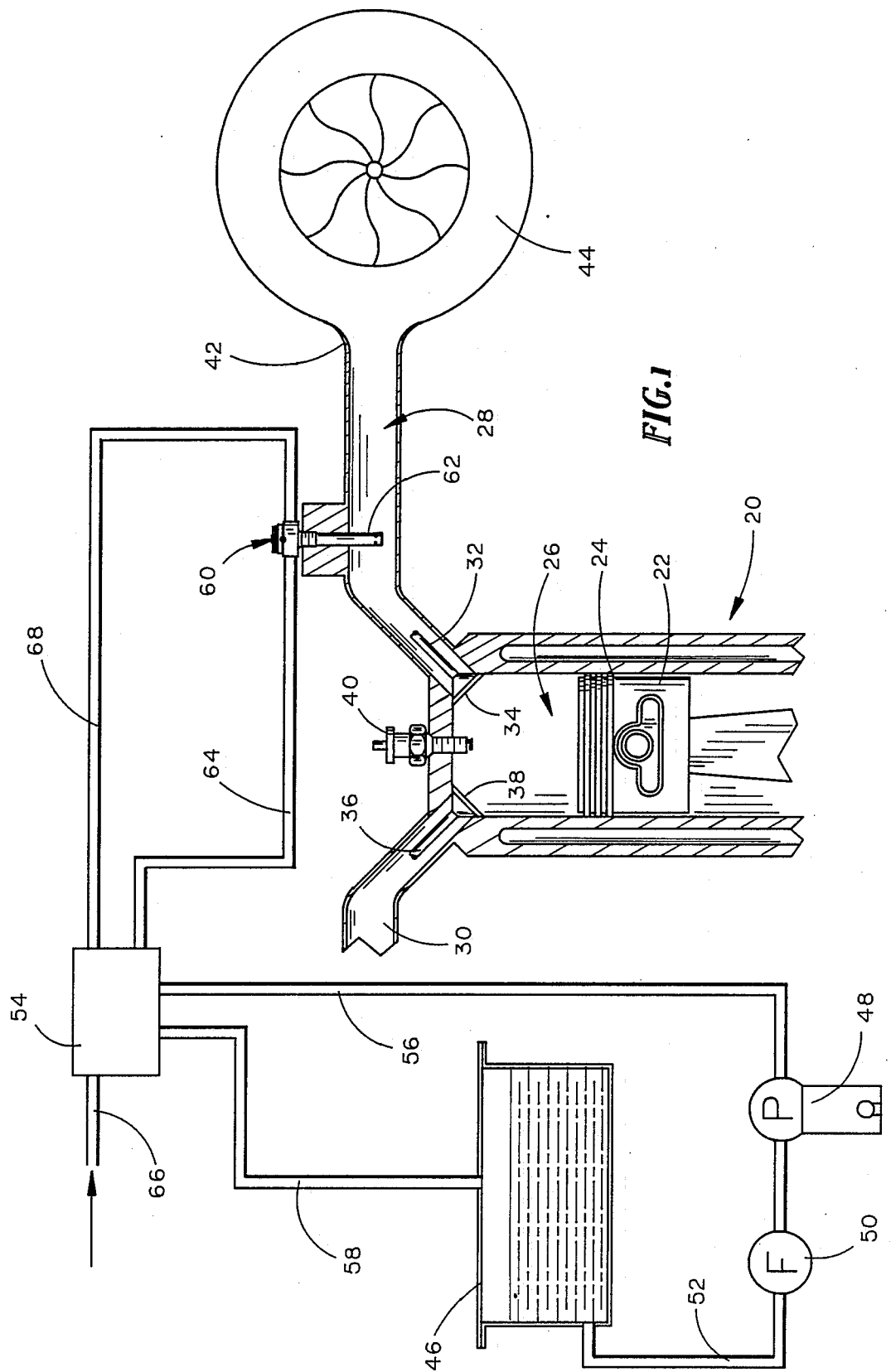
FIG. 1 is a diagrammatical drawing of a conventional diesel engine modified by the apparatus of the present invention to use a hydrous alcohol fuel.

Illustrated in FIG. 1 is a diagrammatical view of a portion of the apparatus of the present invention as used to modify a conventional diesel engine, one cylinder of which is illustrated generally at 20. Inside the cylinder 20 is a piston 22, including piston rings 24. Within the cylinder 20 and above the piston 22 is defined a volume herein called a combustion chamber 26. Two manifolds may communicate with the combustion chamber 26, an intake manifold 28 and an exhaust manifold 30. Communication between the manifolds 28 and 30 and the combustion chamber 26 is regulated by an intake valve 32 and seat 34 and an exhaust valve 36 and seat 38, respectively. Also in communication with the combustion chamber 26 is a diesel fuel injector 40.

Air is supplied to the combustion chamber of each cylinder of the diesel engine through a common intake manifold opening 42. The diesel engine of the preferred embodiment includes a turbocharger 44 which forcefully injects air into the intake manifold opening 42, through the intake manifold 28 and, if the intake valve 32 is open, into the combustion chamber 26.

A hydrous alcohol fuel for use in the modified diesel engine is contained in a tank or reservoir 46. The alcohol fuel is pumped by an electric pump 48 which draws the alcohol fuel from the tank 46 and through a filter 50 by way of a pump supply line 52. The pump 48 pumps the alcohol fuel to a control apparatus 54 of the invention, which will be described in detail below, through an alcohol fuel supply line 56. If the rate of fuel being delivered to the control apparatus exceeds that being consumed in the engine, the excess fuel will be returned to the tank 46 from the control apparatus by way of a fuel return line 58.

A fuel injector 60 for delivering the hydrous alcohol fuel to the modified engine includes an injector nozzle 62. The injector 60 is secured to a wall of the intake manifold 28 such that the injector nozzle 62 is within the intake manifold 28. The hydrous alcohol fuel is supplied to the injector 60 through a fuel supply line 64. In the preferred embodiment, the engine throttle is controlled by pressurized air in response to movement of the accelerator pedal by an operator. An air feed line 66 from the engine throttle control enters the control apparatus 54 and is also supplied to the injector 60 by way of an injector air line 68.

The injector 60, as illustrated in FIG. 2, includes the injector nozzle 62, a head member 70, and a screw cap 72. A threaded portion 74 at the proximal end portion of the nozzle 62 is provided for releasable securement of the injector 60 in a corresponding threaded aperture in the wall of the intake manifold of the engine.

Received inside the nozzle 62 and extending into the head member 70 is a channelled cylinder 76 (FIGS. 3–5). Inscribed on the outer periphery of the cylinder 76 is a pair of diametrically opposed longitudinal grooves, one of which is illustrated in FIGS. 3 and 4 at 78a, that extend from the distal end of the cylinder 76 to a first reduced section 80 thereof which, when the cylinder 76 is assembled in the injector 60 (FIG. 4), is located inside the head member 70 near the threaded portion 74. A pair of rectangular wells 75 are carved in the outer periphery of the cylinder 76 near the distal end thereof and are each associated and in communication with one of the longitudinal grooves 78. A second reduced section 82 is located near the proximal end of the cylinder 76. Between the two reduced sections 80 and 82 are located a pair of seats 84a and 84b into each of which is received an O-ring 86a and 86b, respectively.

The cylinder 76 includes a longitudinal bore 88 (FIG. 5) which is open at the proximal end of the cylinder 76 and which communicates with the exterior of the cylinder 76 at an air inlet 90 and at a pair of air outlet orifices 92, one of which is illustrated at 92a in FIG. 5, the other being located diametrically opposite of the illustrated orifice 92a. Each of the air outlet orifices 92 is centrally located within one of the rectangular wells 75.

When assembled, the cylinder 76 is held in a fixed position by a set screw 94 that is threaded into the body member 70 and seated in a receptacle 96 at the proximal end of the cylinder 76 (FIG. 3). The assembled injector 60 (FIG. 4) is essentially divided into an air flow region and a fuel flow region. The second reduced section 82 is spaced from the inner wall of the body member 70 and forms therebetween an air chamber 98 that is in communication with a threaded air line receptacle 100 in the outer periphery of the body member 70 by way of air passage 102. Similarly, the first reduced section 80 is spaced from the inner wall of the body member 70 and forms therebetween a fuel chamber 104 that is in communication with a threaded fuel line receptacle 106 in the outer periphery of the body member 70 by way of fuel passage 108. The air chamber 98 and the fuel chamber 104 are isolated from each other by the O-rings 86.

Pressurized air present in the air line receptacle 100 will flow through the air passage 102, into the air chamber 98, through the air inlet 90, into the central bore 88, and out of the outlet orifices 92. Hydrous alcohol fuel under pressure in the fuel line receptacle 106 will flow through the fuel passage 108, into the fuel chamber 104, down the longitudinal grooves 78, and to the wells 75. A pair of diametrically opposite nozzle openings 110 are provided in the nozzle 62, one of which is illustrated in FIGS. 2 and 3 at 110a, and are each located so as to be over a well 75 when the cylinder 76 is assembled into the injector 60. Accordingly, pressurized fuel and air will be released from the nozzle 62 through the nozzle openings 110, and the pressurized air will act to break the fuel stream into small droplets and disperse or fumigate them into the air stream in the intake manifold.

Figure 6:
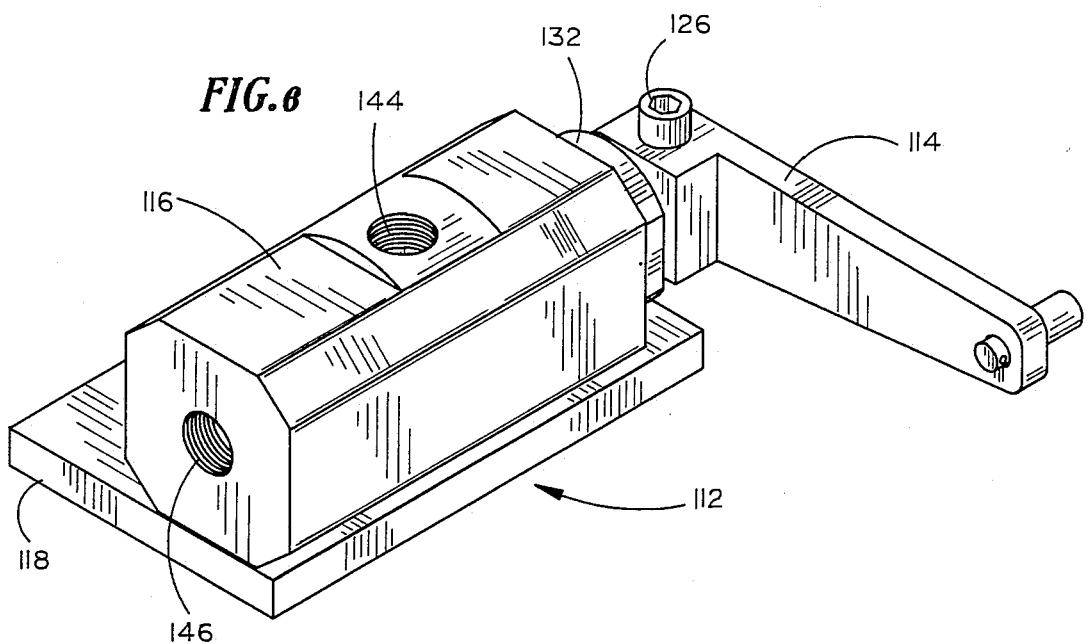
FIG. 6 is a perspective view of a fuel regulator of the present invention.

A fuel flow regulator 112 (FIGS. 6–8) is provided for regulating the flow of hydrous alcohol fuel to the injector during certain parts of the operation of the modified diesel engine. The flow of fuel through the fuel regulator 112 is responsive to the angular position of a pivotable control arm 114, as will be described in more detail below.

Figure 7:
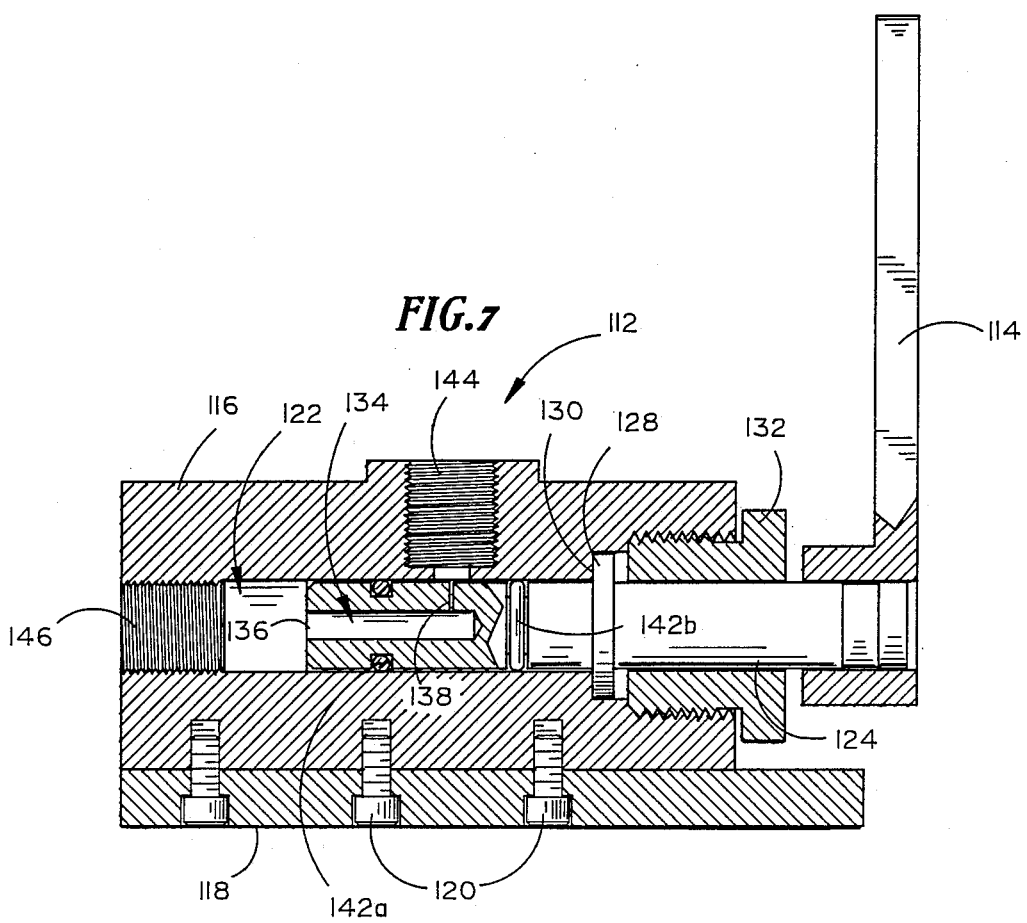
FIG. 7 is a cross-sectional view of the fuel regulator.
Figure 8:
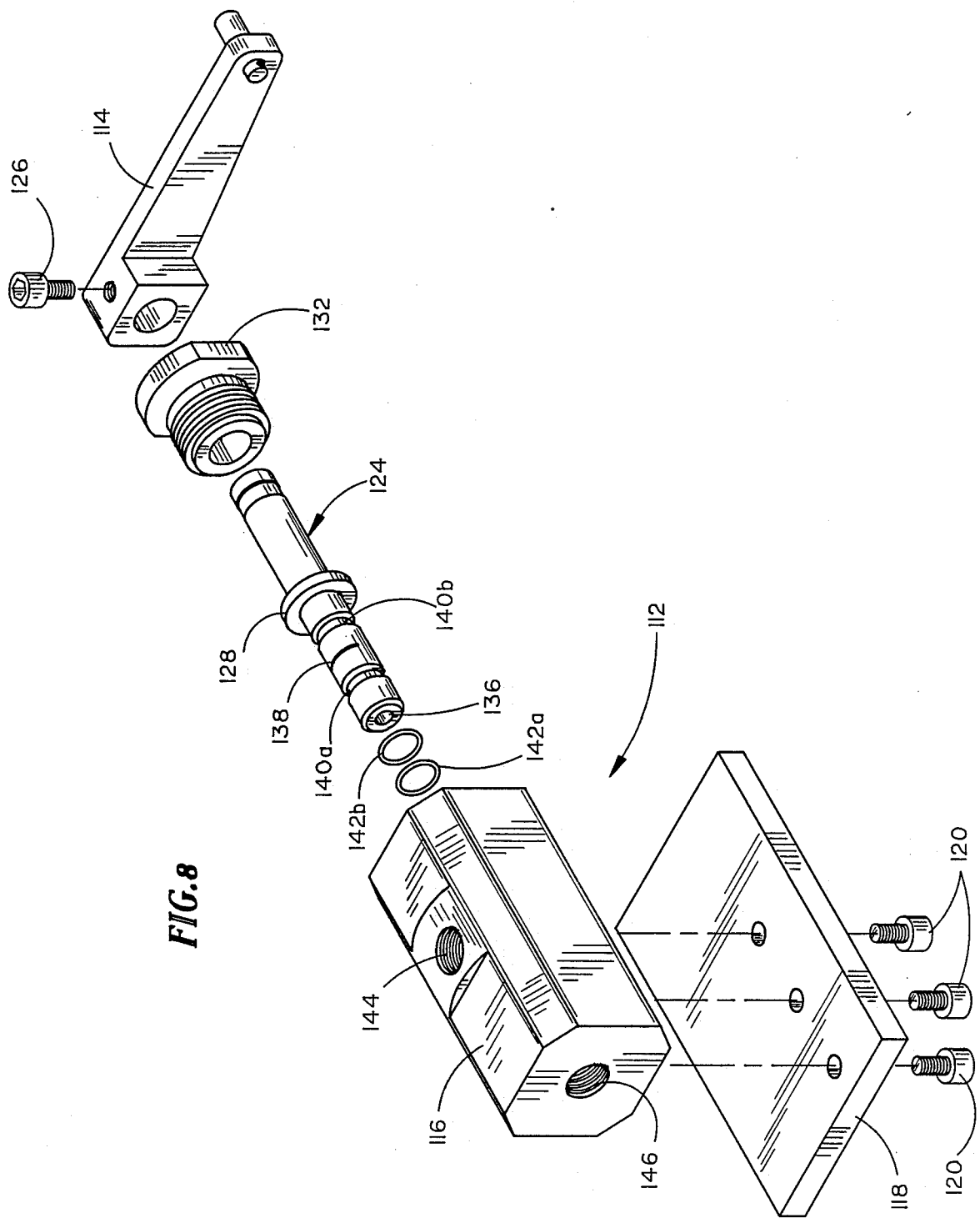
FIG. 8 is an exploded perspective view of the fuel regulator.

A body housing 116 of the regulator 112 is mounted on a base 118 by a plurality of bolts 120 (FIG. 8). The body housing 116 has a central longitudinal throughbore 112 (FIG. 7) into one end of which is received a value spool 124 for relative axial pivotal movement therein in response to pivotal movement of the control arm 114 which is releasably connected to the valve spool 124 by a set screw 126 (FIG. 8).

The valve spool 124 includes a radially extended flange 128 which, when assembled in the body member 114, rests against an annular shoulder 130 of the throughbore 122 to define the assembled position of the valve spool 124 in the throughbore 122. A retaining member 132 is threadedly received in the throughbore 122 to hold the valve spool 124 in place inside the body member 116.

The end of the valve spool 124 inside the body member 116 includes a longitudinal bore 134 that has an outlet 136 at one end thereof. An inlet to the bore 134 is provided by a transverse slot 138 that extends from the outer periphery of the valve spool 124 to the bore 134. The transverse slot 138 is of a length to subtend an angle of approximately 90° or one-quarter of the circumference of the valve spool 124 at the transverse slot 138.

A pair of reduced sections 140a and 140b on either side of the transverse slot 138 each receive one of a pair of O-rings 142a and 142b, respectively, A threaded fuel line inlet 144 of the body member 116 is in communication with the throughbore 122 in the region of the transverse slot 138 (FIG. 7). A threaded fuel line outlet 146 of the body member 116 is in communication with the throughbore 122 and the bore 134 of the valve spool 124. Accordingly, pressurized fuel present in the fuel inlet 144 may flow through the slot 138, into the bore 134, out the outlet 136, and through the fuel outlet 146. Fuel flow other than through the slot 138 is prevented by the O-rings 142.

If the valve spool 124 has been pivoted by the control arm 114 to a position wherein no part of the slot 138 is open to the fuel inlet 144, no fuel will be permitted to flow through the regulator 112. As the control arm 114 is moved to pivot the valve spool 124 to bring the slot 138 into communication with the fuel inlet 144, fuel will be allowed to flow through the regulator 112. The amount of fuel that will flow through the regulator is a function of the length of the slot 138 that is open to the fuel inlet 144, and the exposed length is a function of the angular position of the control arm. The regulator 112 thus controls the amount of fuel that is permitted to flow through it by adjustment of the angular position of the control arm 114.

Figure 9:
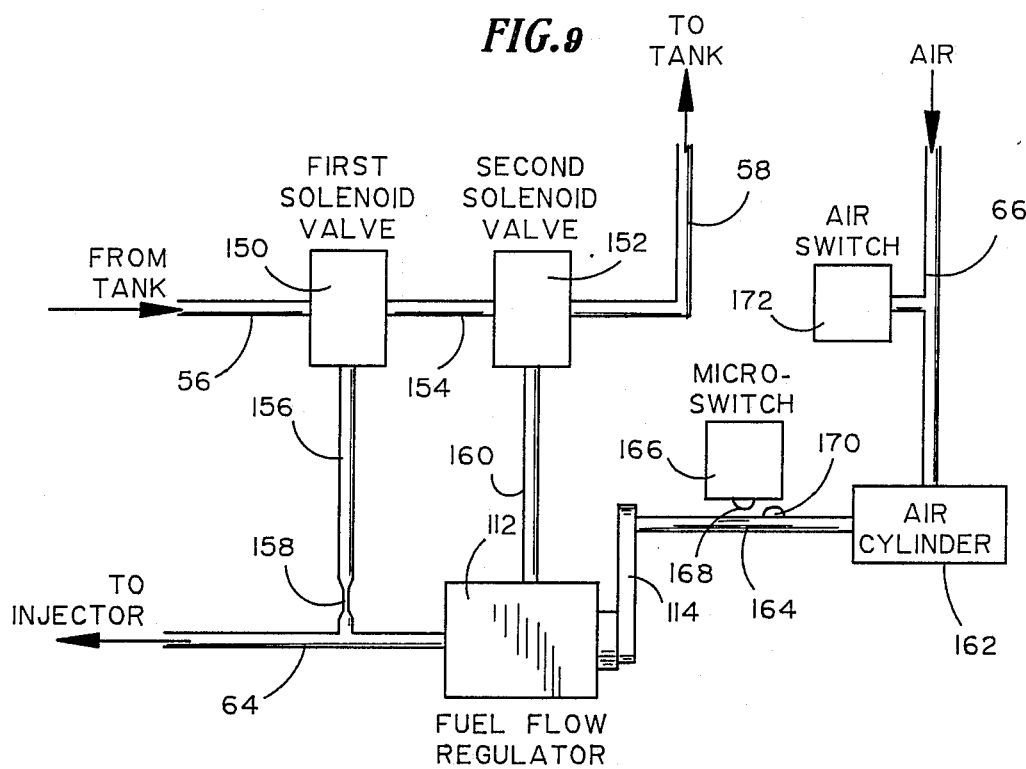
FIG. 9 is a schematic diagram of the hydrous alcohol and pressurized air circuitry of the invention.

The fuel regulator is a part of the control apparatus, illustrated schematically in FIG. 1 at 54. Referring to FIG. 9, hydrous alcohol fuel enters the control apparatus via the fuel supply line 56 and is directed to a first electrically actuated solenoid valve 150. If the first solenoid 150 is in a closed position therefor, fuel will be directed to a second electrically actuated solenoid valve 152 via solenoid bypass line 154. If the second solenoid 152 is also in a closed position therefor, fuel will be returned to the tank through the fuel return line 58.

If the first solenoid 150 is in an open or "on" position therefor, fuel will be directed through a first solenoid outlet line 156, through a flow restrictor 158, and to the fuel injector 60 (FIG. 1) via the injector supply line 64.

If the first solenoid 150 is closed and the second solenoid 152 is in an open or "on" position therefor, fuel will be directed to the fuel flow regulator 112 via a regulator supply line 160. If the control arm 114 of the regulator 112 is in a position to permit fuel to flow through the regulator 112, fuel will be supplied to the injector through the injector supply line 64.

The position of the control arm 114 is adjusted by an air cylinder 162 which includes an extensible and retractable piston 164 that is connected at its distal end to the control arm 114. Pressurized air associated with the throttle control of the vehicle is supplied to the air cylinder 164 by the air supply line 66. The position of the control arm 114 of the fuel regulator 112, and therefore the flow of fuel to the injector through the regulator 112, is thus responsive to the throttle air pressure in the air supply line 66.

A microswitch 166 for controlling the solenoids 150 and 152, as will be described below, is located near the piston 164 of the air cylinder 162. A button 168 of the microswitch 166 is depressed by a cam 170 of the piston 164 as the piston 164 is extended and retracted past an appropriate point. Depressing the button 168 which will act to change the operating condition of the solenoids 150 and 152. An air switch 172 is in communication with the air supply line 66 and is responsive to the pressure of air in the supply line 66 to control the invention as will be described below.

Figure 10:
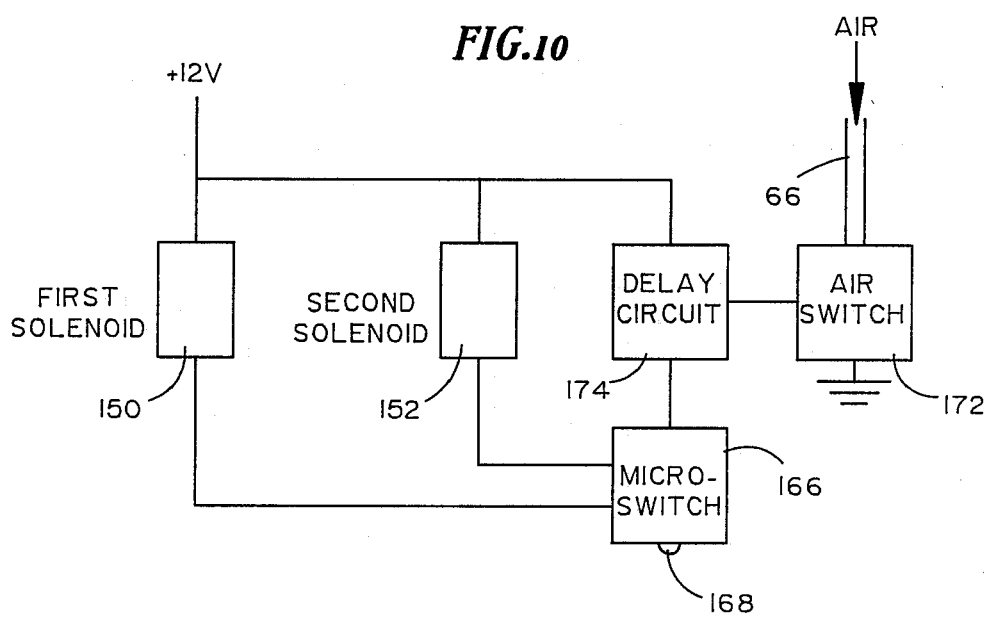
FIG. 10 is a schematic diagram of the electrical control circuitry of the invention.

The electrical control circuitry of the preferred embodiment, illustrated schematically in FIG. 10, includes the microswitch 166 for controlling the solenoid valves 150 and 152. When the button 168 of the microswitch 166 is depressed, the microswitch 166 is in the condition to energize the first solenoid valve 150 to its open or "on" position. When the button 168 is not depressed, the microswitch 166 is in the condition to energize the second solenoid valve 152 to its open or "on" position. Thus, current flowing through the microswitch 166 will either open the first solenoid valve 150 and close the second solenoid valve 152 (button 168 depressed), or it will close the first solenoid valve 150 and open the second solenoid valve 152 (button 168 not depressed). The button 168 is biased to the nondepressed position and will be in such position except when depressed by the cam 170.

A delay circuit 174 is interconnected between the air switch 172 and the microswitch 166. The air switch 172 generates a voltage signal that is responsive to the pressure of the air in the supply line 66. The delay circuit 174 differentiates the voltage signal from the air switch 172 and will supply current to the control circuitry only if a selected threshold pressure is exceeded (approximately 2 psi in the preferred embodiment) and if the voltage level is either steady or rising. In combination with the microswitch 166, the delay circuit 174 permits current to flow to open the first solenoid valve 150 only for an adjustable interval of between one-half and four seconds following depression of the button 168 by the cam 170. After such interval, current will not be permitted to energize the first solenoid valve for an adjustable interval of between five and fifteen seconds, regardless of the depression or release of the button 168. Alternatively, the microswitch 166 can be replaced by an electronic switch that is directly connected to the delay circuit 174 that is responsive to the voltage signal from the air switch 172 to control the two solenoid valves 150 and 152 as previously described. The cam 170 would not be used with the electronic switch, as it is responsive to the air pressure via the air switch 172 and the delay circuit 174. A disable switch (not shown) is operated by the gear shift lever of the vehicle such that the 12 volt supply current is not available for the control apparatus except when the vehicle is in "Drive".

In operation of a vehicle which has been modified by the present invention, the pump 48 is energized and begins pumping the hydrous alcohol fuel when the vehicle is started. The control apparatus will be connected to the 12 volt electrical system of the vehicle when the gear shift lever is moved to the "Drive" position. At idle, the throttle or accelerator of the vehicle is not depressed and no pressurized air is present in the supply line 66. Both solenoid valves 150 and 152 (FIGS. 9 and 10) will be closed so that fuel being supplied to the control apparatus will be returned to the tank 46 through the fuel return line 58. The engine will be running on diesel fuel only.

As the accelerator of the vehicle is depressed, pressurized air will be present in the air supply line 66. This will act to close the air switch 172 and to extend the piston 164 of the air cylinder 162. The farther the accelerator is depressed, the farther the piston 164 will extend. As described above, extension of the piston 164 will pivot the control arm 114 of the regulator 112, thereby permitting fuel to flow through the regulator 112 and to the injector. If the piston 172 extends an amount sufficient that the cam 170 depresses the switch 168, the second solenoid valve 152 will be closed and the first solenoid valve 150 will be opened, each for a one-second interval, during which fuel will be supplied to the injector from the first solenoid valve 150 and through the restrictor 158. The restrictor 158 is selected to supply fuel at a preselected rate, which in the preferred embodiment is 8 gallons per hour, typically higher than the maximum flow rate of the regulator 112.

When the accelerator is released, even partially, the pressure of air in the air supply line 66 will drop. The delay circuit 174, acting as a differentiation circuit, opens in response to a decrease in air pressure to immediately close the two solenoid valves 150 and 152 and thereby stop the flow of fuel to the injector.

The control apparatus thus has three distinct states: (1) a constant boost fuel flow state for a maximum of selected intervals of between one-half and four seconds that are interrupted or prevented from recurring by a selected interval of between five an fifteen seconds; (2) an "off" state at idle and low acceleration or when the accelerator has just been released (deceleration); and (3) an adjustable flow state where the flow of fuel to the injector increases in response to increasing depression of the accelerator.

While emission reductions are observed during intervals of constant engine rpm with use of the supplemental hydrous alcohol fuel, greater reductions are observed if, during periods of heavy acceleration, the rate of flow of diesel fuel is reduced from what would be used in an unmodified engine. The maximum flow rate through the diesel fuel injectors of diesel engines are adjustable by well-known techniques and are dependent on the particular engine design. Whichever technique is used, the maximum flow rate is reduced to limit the flow of diesel fuel to the engine. Ordinarily, this would act to reduce the acceleration (power) of the vehicle (engine). Injection of hydrous alcohol fuel in supplementation of the reduced flow of diesel fuel will compensate for this power loss and the vehicle will perform at least as well as an unmodified vehicle. Because diesel engines are notoriously "dirty" during periods of heavy acceleration (sometimes due to overfueling), reducing the amount of diesel fuel will, by itself, reduce emissions. The hydrous alcohol fuel further acts to reduce emissions as well as increasing engine power. The invention is therefore particularly suited to use in vehicles which operate under conditions of frequent acceleration, most notably urban transit buses.

Extensive testing has been done to develop hydrous alcohol fuel mixtures for use in diesel engines modified by the apparatus of this invention. Hydrous alcohols offer very little lubricity and have a washing or cleansing effect on engine and fuel system parts with which they come into contact. Metals typically found in engines and fuel systems, particularly aluminum and ferrous metals, will corrode over time in the presence of hydrous alcohols. Considerable research has been done by others in this field to develop a corrosion inhibitor to be added to alcohol fuels to counteract this effect. It is also advantageous to add a lubricant to the alcohol to compensate for the washing effect.

A synthetic oil developed for use in two-cycle, high rpm engines has been found to act as both an anti-corrosive and as a lubricant. The oil used in the preferred embodiment is a synthetic oil manufactured by Klotz Special Formula Products, Box 11343, Fort Wayne, Indiana 46857, and identified by it as KL200. The oil is partially water-soluble and is typically used in two-cycle engines as a lubricant added to the fuel. The oil blends well with hydrous alcohols of a wide range of proofs and, if properly blended, has been observed not to separate out of suspension or solution over time. The addition of small quantities of the oil to the hydrous fuel mixtures will substantially increase the lubricity of the fuel and effectively prevent corrosion of the fuel system and engine parts.

For use in the preferred embodiment of the invention, a ratio of 1 part synthetic oil to 600 parts of the hydrous alcohol fuel is used. Tests have shown that the maximum desirable concentration of the oil to be approximately 1 part synthetic oil to 400 parts alcohol fuel. Above this concentration, over-lubrication of the engine is indicated by smoke in the engine exhaust and by oil accumulation within the engine.

The minimum concentration of oil found to be effective is approximately 1 part synthetic oil to 900 parts hydrous alcohol fuel. Below this concentration, corrosion of ferrous and aluminum engine and fuel system parts can occur, and the washing effect of the hydrous alcohol fuels is insufficiently compensated. Products of oxidation of fuel system and engine parts due to corrosion from insufficient synthetic oil concentrations can be carried by the fuel and deposited in the engine, which will be quickly fouled and damaged.

The specific formulation of the hydrous alcohol fuel mixture best suited for use in a vehicle will depend upon the specific type of diesel engine in the vehicle. For turbocharged diesel engines having an unmodified maximum power within the range between 150 and 350 horsepower, an optimum hydrous alcohol fuel mixture is used which consists of 41% anhydrous alcohol, 58.83% deionized water, and 0.17% synthetic oil all by volume. Deionized water is required to eliminate or reduce dissolved minerals which may precipitate and damage the engine and fuel system. Of course, hydrous alcohol can be used provided the ratio of hydrous alcohol to water is adjusted so that the mixture has the appropriate ratio of alcohol and water.

The advantages of the invention continue to be experienced if the alcohol to water ratio is reduced to approximately 2 parts alcohol to 4 parts deionized water. Decreasing the proportion of alcohol to water below this ratio causes excess cooling of the combustion gases, which reduces the efficiency of the engine to the point where no emission reductions are experienced. Non-turbocharged diesel engines require a higher proof hydrous alcohol fuel mixture. An upper limit of approximately 7 parts alcohol to 3 parts water has been observed. Above this ratio, engine exhaust temperatures become excessively high and "pinging" or predetonation of the hydrous alcohol fuel occurs.

If methyl alcohol is used as the alcohol component of the hydrous alcohol fuel, a sequence for blending the hydrous alcohol fuel mixture should be followed. The tank or reservoir for containing the fuel can be any ordinary fuel receptacle that is clean of all foreign matter. The appropriate quantity of synthetic oil is added to the tank or reservoir first. Next, the appropriate quantity of methanol is added; the agitation which occurs during the addition of the methanol will usually be sufficient to blend evenly the synthetic oil in the methanol. Lastly, the appropriate amount of deionized water is added to complete the hydrous alcohol fuel mixture. Proper fuel mixtures are difficult to obtain if the sequence is not followed; below 30 degrees Fahrenheit ambient temperature, proper blending of the three fuel elements becomes almost impossible unless the methanol and synthetic oil are first mixed. Use of improperly blended fuel can cause damage to the diesel engine.

The hydrous alcohol fuel supplied to the injector 60 from the control apparatus 54 will be present at the distal end of the nozzle 62 in the airstream of the intake manifold 28 (FIG. 1). Pressurized air, supplied to the injector 60 from the throttle control through the injector air supply line 68, will also be flowing through the injector 60 into the intake manifold 28. The design of the injector 60 is such that the pressurized air will act to break up the fuel into small droplets and disperse or fumigate it into the intake manifold 28 where it will be entrained in the airstream from the turbocharger 44 and be carried into the combustion chamber 26 for combustion with the diesel fuel. Because the rate of flow of fuel to the injector is normally responsive to the pressure of air in the throttle control, higher pressure air will be available to disperse greater amounts of fuel so that the fuel will be efficiently fumigated into the intake manifold over the range of operating conditions.

EXPERIMENTAL TESTING

A Detroit Diesel 6V92-TA engine was rated at 277 horsepower at an engine speed of 2100 r.p.m. and had a rated peak torque speed of 1200 r.p.m. Idle speed of the engine was 600 r.p.m. Specified exhaust restriction, at engine operating conditions of 2100 r.p.m. full load, was 4.00 inches of mercury for transient evaluations. The intake restriction was 20 inches of water.

The diesel fuel used in the testing was D-2 emissions test fuel from Phillips Chemical Company. Properties of this fuel are given in Table 1.

TABLE 1

|  | EM-796 Lot G-892 | EPA Spec.[a] | Test Method |
|---|---|---|---|
| Cetane Number | 45 | 42–50 | D613 |
| Distillation Range |  |  | D86 |
| IBP, °F. | 361 | 340–400 |  |
| 10% Point, °F. | 402 | 400–460 |  |
| 50% Point, °F. | 499 | 470–540 |  |
| 90% Point °F. | 589 | 550–610 |  |
| End Point, °F. | 638 | 580–660 |  |
| Gravity, °API | 35.1 | 33–37 | D287 |
| Total Sulfur, wt. % | 0.32 | 0.2–0.5 | D2622 |
| Aromatics (FIA), vol. % | 33 | 27 min. | D1319 |
| Kinematic Viscosity (cS) | 2.4 | 2.0–3.2 | D445 |
| Flash Point (PM), °F. | 151 | 130° min. | D93 |
| Cloud Point, °F. |  | — | D2500 |

[a]Diesel fuel as descried in 40 C.F.R. §86.1313-84.

The engine was modified by the addition of the invention as described above. The fuel flow restrictor permitted a constant flow of 8 gallons per hour and the control apparatus started to deliver the hydrous alcohol fuel above a pressure of 2 psi in the throttle control or air supply line. Hydrous ethanol fuel of 41% ethanol, 58.87% deionized water, and 0.17% synthetic oil, by volume, was used. Three exhaust treatment devices were tested: ETD-1, a bead catalyst canister; ETD-2, a cyclone collector canister; and ETD-3, an electrostatic filter.

A dynamometer test cell capable of operation over the heavy-duty engine transient cycle of the Environmental Protection Agency was used. A constant volume sampler (CVS) was used that had a nominal capacity of 59 m$^3$/min. (2000 cfm). A double dilution tunnel with a secondary flow rate of 0.05 m$^3$/min (1.8 cfm) was used for particulate measurement.

Gaseous and particulate emissions instrumentation and procedures were in accord with Title 40, Subpart N of the Code of Federal Regulations, and smoke tests were conducted in accord with Subpart H. Hydrocarbon (HC) emissions are measured continuously during the test cycle by hot FID. Carbon monoxide (CO) and carbon dioxide ($CO_2$) are measured by NDIR using bagged samples. Oxides of nitrogen ($NO_x$) are measured continuously by chemiluminescence. Particulates are determined by weight gain on a 90 mm Pallflex filter.

Aldehyde emissions were determined by DNPH, and ethanol was determined by GC-FIC. The procedures for aldehydes and ethanol determination are given in the report EPA 460/3-b 83-009, "Calculation of Emissions and Fuel Economy When Using Alternate Fuels." Fuel consumption in terms of BSFC was determined by standard carbon balance analyses of the regulated carbon-containing emissions. Diesel fuel usage during the test cycle was determined by integration of continuous measurements using a Flotron. Amount of hydrous ethanol fuel used was determined by the decrease in weight of the supply tank.

The transient cycle is described by means of percent of maximum torque and percent of rated speed for each one-second interval, for a test cycle of 1199 seconds duration. In order to generate the transient cycle, the engine's full power curve is obtained from an engine speed below idle rpm to maximum no-load engine speed. Data from this "power curve," or engine map, are used in conjunction with the specified speed and load percentages to form the transient cycle.

A transient test consists of a cold-start transient cycle and a hot-start transient cycle. The same engine command cycle is used in both cases. For the cold-start, the diesel engine is operated over a "prep" cycle, then allowed to stand overnight in an ambient soak temperature of 68 to 86° F. The cold-start transient cycle begins when the engine is cranked for cold start-up. Upon completion of the cold-start transient cycle, the engine is shut down and allowed to stand for 20 minutes. After this hot soak period, the hot-start cycle begins with engine cranking.

In order to determine how well the engine follows the transient cycle command, engine responses are compared to engine commands and several statistics are computed. These computed statistics must be within tolerances specified in the CFR. In addition to the statistical parameters, the actual cycle work produced should not be more than 5 percent above, or 15 percent below the work requested by the command cycle. After completion of the cold-start and the hot-start transient cycles, transient composite emissions results are computed by the following:

$$\text{Brake Specific Emissions} = \frac{1/7 \text{ (Mass Emission, Cold)} + 6/7 \text{ (Mass Emission, Hot)}}{1/7 \text{ (Cycle Work, Cold)} + 6/7 \text{ (Cycle Work, Hot)}}$$

Without provisions for limiting the maximum power output of the engine, addition of the invention will increase the maximum power output of the engine. For the evaluations conducted, the power output map obtained with the engine in the baseline configuration was used for all emission tests conducted. This was to simulate a control system for the engine with the invention installed that would limit maximum power output to that of the standard engine.

Composite values of the results of the emissions tests are calculated using the overall average values of the cold- and hot-cycle results are summarized in Table 2.

TABLE 2

| Emission Control Configuration | Regulated Emissions, g/bhp-hr | | | | |
|---|---|---|---|---|---|
| | $HC^b$ | CO | $CO_2$ | $NO_x$ | Part. |
| Diesel Baseline | 0.98 | 2.1 | 696 | 5.0 | 0.53 |
| ETD-1, & ETD-2 | $0.57^c$ | 1.1 | 709 | 4.8 | 0.28 |
| ETD-1, & ETD-3 | 0.78 | 1.5 | 695 | 5.0 | 0.22 |

| Emission Control Configuration | Unregulated Emissions, g/bhp-hr | | Cycle Work, bhp-hr | BSFC, lb/bhp-hr$^e$ | Additive Weight Percent$^f$ |
|---|---|---|---|---|---|
| | Ethanol | Aldehydes | | | |
| Diesel Baseline | — | — | 17.2 | 0.487 | 0 |
| ETD-1, & ETD-2 | 0.14 | $0.21^d$ | 16.4 | 0.493 | $7^g$ |
| ETD-1, & ETD-3 | — | — | 16.4 | 0.484 | $11^g$ |

$^a$Calculated using the average cold- and hot-cycle data for each configuration tested.
$^b$HC values based on FID readings and an HCR of 1.86.
$^c$Calculated values are 0.14 g/bhp-hr of ethanol and 0.52 g/bhp-hr of standard hydrocarbons.
$^d$Formaldehyde, acetaldehyde, and other were 0.05, 0.15, and 0.01 g/bhp-hr, respectively.
$^e$BSFC based on carbon balance and a fuel HCR of 1.86.
$^f$Total hydrous ethanol fuel added during test cycle as weight percent of diesel fuel used.
$^g$Values have been corrected using recalculated values for diesel fuel consumption.

The FID instrument has a response factor of 0.8 for ethanol and has a negligible response to aldehydes. The amount of standard hydrocarbons (i.e., diesel fuel derived) in g/bhp-hr can be calculated using the following formula:

Standard HC = HC by FID − 0.36 × Ethanol

Aldehydes measured include nine different compounds, but only two of the nine generally occur in significant quantities: formaldehyde and acetaldehyde. The BSFC reported is based on a carbon balance calculation of the measured emissions and assumes a hydrogen to carbon ratio of 1.86.

Both emission control configurations tested reduced HC, CO, and particulate emissions, but there were no significant differences in $NO_x$ emissions or BSFC. With the emission control configuration that included the exhaust treatment device ETD-2, an average of 0.14 g/bhp-hr ethanol and 0.21 g/bhp-hr of aldehydes were measured in the exhaust.

Work produced by the engine in the emission control configurations was between four and five percent lower than in the baseline configuration. The specific areas of the cycle in which reduction in power occurred were not determined. In the emission control configurations, the hydrous ethanol fuel metered into the intake during high power conditions. Over the entire cycle, the amount of additive provided to the engine was seven to eleven weight percent of the amount of diesel fuel used.

I claim:

1. Apparatus for reducing the emissions of a diesel engine, comprising:
   (a) a hydrous alcohol fuel of between about 33 percent and about 70 percent alcohol by volume and between about 30 percent and 67 percent water by volume;
   (b) a fuel injector for delivering said hydrous alcohol fuel for combustion in the engine; and
   (c) means for controlling the delivery of said fuel to the engine in response to operating conditions of the engine, such that said fuel is delivered for combustion only when the engine is being operated to increase the rate of engine revolutions and when the engine is being operated substantially to maintain the rate of engine revolutions.

2. Apparatus as defined in claim 1 wherein said alcohol is selected from the group including methanol and ethanol.

3. Apparatus as defined in claim 1 wherein the engine includes an intake manifold and said fuel injector fumigates said hydrous alcohol fuel into the airstream of the intake manifold.

4. Apparatus as defined in claim 1, further comprising a fuel flow regulator for adjusting the flow rate of said hydrous alcohol fuel to said fuel injector in response to the rate of revolutions of the engine.

5. Apparatus as defined in claim 1 wherein said control means includes means for delivering said fuel at a constant flow rate and means for delivering said fuel at an adjustable flow rate responsive to the rate of engine revolutions and to changes in the rate of engine revolutions.

6. Apparatus as defined in claim 1, further comprising means for reducing the maximum flow rate of diesel fuel for combustion in the engine, and wherein said control means delivers said hydrous alcohol fuel for combustion in the engine to compensate for said reduced flow rate of diesel fuel.

7. A method for reducing the emissions of a diesel engine, comprising the steps of:
   (a) injecting a hydrous alcohol supplemental fuel for combustion in the engine, said fuel being a mixture of between about 30 percent and 67 percent alcohol by volume and between about 33 percent and 70 percent water by volume; and
   (b) controlling said injecting in response to operating conditions of the engine wherein said hydrous alcohol fuel is injected only when the engine is being operated to increase engine r.p.m. and when the engine is being operated substantially to maintain engine r.p.m.

8. A method as defined in claim 7, wherein said alcohol is selected from the group including ethanol and methanol.

9. A method as defined in claim 7, wherein said injecting step includes fumigation of said hydrous alcohol fuel into the airstream of an intake manifold of the engine.

10. A method as defined in claim 7, wherein said injecting step includes injection of said hydrous alcohol fuel at a constant flow rate and at a flow rate that corresponds to the engine r.p.m.

11. A method as defined in claim 7 further comprising the steps of reducing the maximum flow rate of diesel fuel for combustion in the engine and injecting said hydrous alcohol fuel for combustion in the engine to compensate for said reduction in flow rate of the diesel fuel.

12. A method as defined in claim 7, further comprising the step of adjusting said injection of said hydrous alcohol fuel to adjust the flow rate of said fuel in response to engine r.p.m.

13. Apparatus for reducing the emissions of a diesel engine having an intake manifold and an accelerator, comprising:
   (a) a hydrous alcohol fuel of between about 33 percent and about 70 percent alcohol by volume and between about 30 percent and 67 percent water by volume;
   (b) a water-soluble oil added to said hydrous alcohol fuel in a ratio of between about one part oil to four hundred parts hydrous alcohol fuel by volume and about one part oil to nine hundred parts hydrous alcohol fuel by volume to increase the lubricity of said hydrous alcohol fuel and to reduce corrosion of engine parts by said hydrous alcohol fuel;
   (c) intake manifold of the engine for delivering said hydrous alcohol fuel into the intake manifold for combustion in the engine;
   (d) pressurized air supply means responsive to the position of the accelerator;
   (e) said fuel injector including an air flow region in communication with said pressurized air supply means and a hydrous alcohol fuel flow region for fumigating said hydrous alcohol fuel inside said intake manifold;
   (f) a fuel regulator for regulating the flow of said hydrous alcohol fuel to said fuel injector; and
   (g) means for controlling said fuel regulator in response to said pressurized air.

14. A method as defined in claim 7 wherein said hydrous alcohol fuel is used to replace a portion of the diesel fuel during periods of increasing engine r.p.m. and results in decreased amounts of particulates being emitted by the engine.

15. A method as defined in claim 7 wherein said hydrous alcohol fuel is used to replace a portion of the diesel fuel during periods of increasing r.p.m. and results in decreased amounts of nitrogen oxides being emitted by the engine.

16. An apparatus as defined in claim 1, further comprising:
   (a) an accelerator for supplying pressurized air to control the delivery of diesel fuel to the engine;
   (b) an intake manifold;
   (c) a fuel injector, having an air flow region in communication with said pressurized air and a hydrous alcohol fuel region, for fumigating said hydrous alcohol fuel into said intake manifold;
   (d) air-operated control means in communication with said pressurized air; and
   (e) a fuel regulator responsive to said control means for regulating the supply of said hydrous alcohol fuel to said fuel injector such that said hydrous alcohol fuel is fumigated into said intake manifold only during periods of increasing engine r.p.m. and of substantially constant engine r.p.m.

* * * * *